Figure 1:
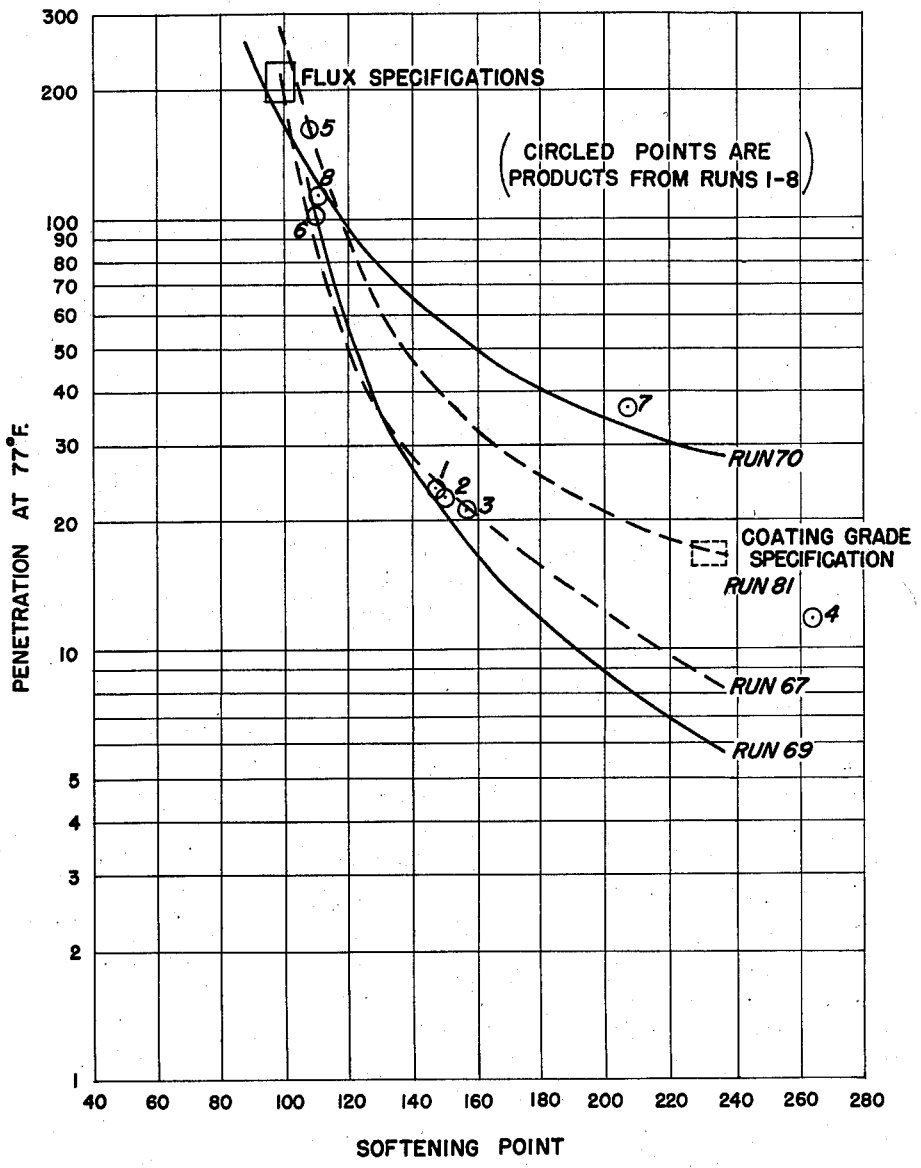

United States Patent Office 3,152,978
Patented Oct. 13, 1964

3,152,978
MINERAL OIL AND FORMALDEHYDE REACTION PROCESS AND PRODUCT
William L. Fierce, Crystal Lake, and Roger L. Weichman, Grayslake, Ill., assignors to The Pure Oil Company, Chicago, Ill., a corporation of Ohio
Filed Dec. 30, 1960, Ser. No. 93,280
11 Claims. (Cl. 208—6)

This invention relates to new, asphalt-like, resinous products prepared by the reaction of any material that can be hardened by air-blowing, i.e., asphaltic materials, petroleum residua and resins, and solvent extracts, with formaldehyde in the presence of a three-component compound catalyst.

Air oxidation or sulfur oxidation of aromatic residual fractions is a standard process for producing asphaltic materials. It is also known in the art of pure organic chemistry that aromatic molecules can be cross-linked with methylene groups by catalytic reaction with formaldehyde. The well known chloromethylation reaction serves to illustrate this type of cross-linking, wherein a chloromethyl group is substituted for a hydrogen atom on the aromatic nucleus and is illustrated as follows using a simple aromatic such as benzene:

(1)
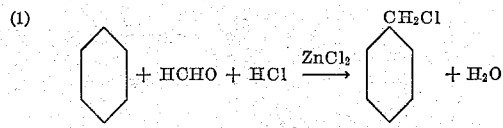

Reaction 1 can be promoted with $H_3PO_4$ and may proceed by either of two routes. The formaldehyde may condense with the aromatic compound to give a benzyl alcohol, which then reacts with the HCl:

(2)
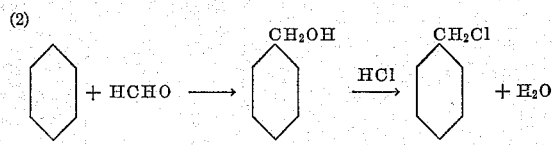

or HCl may add to the formaldehyde to give chloromethyl alcohol, followed by reaction with the aromatic compound to give the benzyl chloride:

(3)
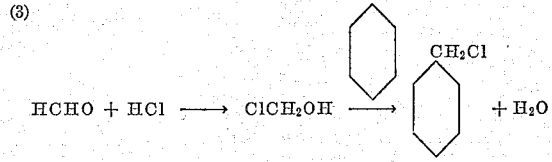

The foregoing reactions are merely illustrations with simple aromatics.

Residual hydrocarbons such as solvent extracts, FCC vacuum residua and asphaltic oils are potential building blocks for petrochemicals. Solvent extracts represent a rich source of complex aromatic compounds which have attracted the attention of chemists since the advent of the solvent extraction process in the petroleum industry. These materials, ordinarily considered to be a waste product, have been subjected to many reactions with such reagents as sulfur, phosphorus, sulfur chloride, phosphorus pentasulfide, sulfur trioxide, halogens and the like in an effort to attach functional groups thereon which will transform the solvent extracts into a more usable material. However, because of their complex nature, solvent extracts have resisted such treatments, for although they are reactive, the end products are so diverse that no uniformity in properties is possible and the end products do not meet expectations. Furthermore, because of the viscous nature of solvent extracts, difficulty is had in handling these materials and in carrying out the reactions. Since there are other sources of aromatics which do not offer these difficulties, solvent extracts have, in the main, remained an economic loss to the petroleum industry.

In accordance with this invention, it has been found that residual petroleum fractions as exemplified by solvent extracts and FCC vacuum residues can be upgraded into resins and plastics by oxidation in the presence of a formaldehyde-producing agent and certain catalyst compositions, namely anhydrous haloacids, a condensation agent, and concentrated strong acid, particularly a catalyst comprising hydrochloric acid, zinc chloride, and concentrated sulfuric acid. By using the process of this invention it was found that a product far superior to ordinary oxidized residues or solvent extracts is produced, the reaction time is reduced by about one-half, and the amount of oxidant necessary for the reaction is reduced by about one-half. Furthermore, it was found that all three ingredients of the catalyst are necessary, namely, the anhydrous haloacid, the condensation agent, and the concentrated strong acid, to produce the new and unexpected upgrading, or resins having particular softening points, penetrations and enhanced ductility. Also, it has been found that by varying the reaction conditions the degree of cross-linking can be controlled and the end properties adjusted to requirements. In another aspect of the invention an intermediate product of lesser softening point, which differs significantly from the ordinary oxidized residues or solvent extract and the primary product herein, can be prepared by carrying out the reaction with the formaldehyde-producing agent, the haloacid, and the condensation agent, omitting the concentrated strong acid.

Accordingly, it becomes a primary object of this invention to provide a new asphalt-like composition prepared from asphaltic materials, residues and materials of the nature of solvent extracts obtained in the solvent extraction of mineral lubricating oils.

An object of this invention is to provide a new resinous composition prepared from solvent extracts obtained in the solvent extraction of mineral lubricating oils.

An object of this invention is to provide new asphalt-like resinous compositions prepared from residual materials generally, and solvent extracts obtained in the manufacture of bright stock oils specifically.

A further object of this invention is to provide a new asphalt-like resinous composition prepared from solvent extracts by reaction under oxidizing conditions in the presence of a new catalyst composition.

Another object of this invention is to provide a new asphalt-like resinous composition prepared from residual hydrocarbons such as solvent extracts by oxidation and simultaneous reaction with a formaldehyde-producing agent in the presence of an anhydrous haloacid, a metal halide salt, and concentrated strong acid.

Another object of this invention is to provide a new asphalt-like resinous composition prepared from solvent extracts from the manufacture of high-viscosity-index bright stock oils by simultaneous oxidation in the presence of paraformaldehyde and a catalyst consisting of anhydrous hydrochloric acid, zinc chloride, and concentrated sulfuric acid.

Still another object of this invention is to provide new asphalt-like resinous products prepared by reacting solvent extracts with oxygen, air or sulfur in the presence of paraformaldehyde, anhydrous hydrochloric acid and zinc chloride, omitting the concentrated sulfuric acid.

These and other objects of this invention will be described or become apparent as the description thereof proceeds.

The drawing FIGURE I is a graphical representation of the results of treating extracts in accordance with the invention in comparison with ordinary air blowing of known asphalts. FIGURE II is a graph based on runs 4 and 7 of Table III and the results shown in Table V. FIGURE III is a similar comparison using FCC unit bottoms.

The novel process and products of the instant invention are illustrated by the following generalized representative reactions:

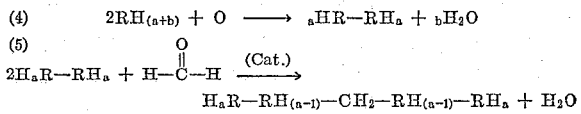

(4) $\quad 2RH_{(a+b)} + O \longrightarrow {}_aHR-RH_a + {}_bH_2O$ (5) $\quad 2H_aR-RH_a + H-\overset{\overset{\displaystyle O}{\|}}{C}-H \xrightarrow{\text{(Cat.)}}$ $\quad\quad\quad\quad H_aR-RH_{(a-1)}-CH_2-RH_{(a-1)}-RH_a + H_2O$ wherein R represents the complex, cyclic, aryl, or alkaryl nucleus from solvent extracts, $a$ represents the number of unreplaceable hydrogen atoms on the R nucleus, $b$ represents the number of replaceable hydrogen atoms on the R nucleus, HCHO represents a formaldehyde-producing agent, such as formaldehyde or paraformaldehyde, and the catalyst comprises an anhydrous haloacid such as hydrogen chloride, hydrogen bromide, or hydrogen iodide, a condensation catalyst such as zinc chloride, aluminum chloride or boron trifluoride, with or without concentrated strong acid, and O may be sulfur, selenium or oxygen, either undiluted or as air or sulfur and/or selenium and oxygen mixtures. The reaction may be conducted stepwise or as a compound reaction and involves oxidative-condensation, chloromethylation and cross-linking with methylene groups. The chloromethylated products are intermediates in the reaction and the final products contain practically no chloromethylated groups.

The starting materials represented by $RH_{(a+b)}$ in Equation 4 are those residual materials of aromatic character, such as are obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons and heterocyclics (the extract and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash of 585° F., fire of 650° F., and C.R. of 13.9 weight percent, and may be black in color. The deasphalted oil may have an API gravity of 21.5° to 21.8°, viscosity SUS at 210° F. of 165–175, NPA color of 6–7, flash of 575° F., fire of 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se; the extract, predominating in complex aromatic constituents, is distinctively useful in accordance with this invention.

For example, a crude oil from an East Texas field with an API gravity of 33.1 was topped to remove such light fractions as gasoline, naphtha, kerosene, and a light lubricating distillate. A second lubricating distillate cut was then obtained which had a viscosity of 240 SUS at 100° F., 1.0% sulfur, and an API gravity of 24.5. This oil was treated with phenol to produce a raffinate from which a high-quality lubricating oil could be prepared. The oil extracted by phenol treatment, after removal of phenol, is ready for use as the starting material in accordance with this invention.

Solvents other than phenol may be used to obtain the extraction product used in accordance with this invention, for example, nitrobenzene, Chlorex, chlorophenol, cresylic acid, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

TABLE I

SOURCES AND PHYSICAL CHARACTERISTICS OF SOLVENT EXTRACTS AND OTHER SOURCE HYDROCARBONS

| Ext. No. | Crude source | Solvent | API grav. | Vis./210° F. | V.I. | ° F. Pour | ° F. Flash | ° F. Fire | Percent C.R. | Percent sulfur | Average molecular wt. |
|---|---|---|---|---|---|---|---|---|---|---|---|
| 1 | East Tex | Phenol | 11.1 | 282 | −40 | +55 | | | 7.2 | 2.66 | |
| 2 | do | do | 15.4 | 285 | +39 | | | | | | |
| 3 | do | do | 12.6 | 310.1 | −1 | +80 | | | 4.7 | 2.27 | |
| 4 | do | do | 14.6 | 313 | +27 | +90 | | | 4.7 | 2.2 | |
| 5 | do | do | 15.4 | 372 | +5 | +60 | | | 4.13 | 2.33 | |
| 6 | do | do | 13.7 | 355 | +27 | +80 | | | | 2.18 | |
| 7 | do | do | 8.6 | 616 | 0 | +70 | | | | | |
| 8 | do | do | 10.5 | 172.1 | −101 | +60 | | | | 2.88 | |
| 9 | Santa Fe Springs | do | 10.2 | 371 | | +65 | 520 | 600 | | | |
| 10 | Texas | Furfural | 13.2 | 1,500 | | +85 | 470 | 515 | | | |
| 11 | Penn | Chlorex | 12.2 | 1,365 | | +85 | 560 | 630 | | | |
| 12 | | Nitrobenzene | 10.0 | 1,500 | | +75 | 555 | 640 | | | |
| 13 | Mid-Cont | Propane-cresol | 14.4 | 1,500 | | +100 | 540 | 605 | | | |
| 14 | do | Phenol | 13.6 | 41.7 | −82 | +20 | | | | | |
| 15 | do | Chlorex | 13.6 | 200 | −61 | +75 | | | | | |
| 16 | do | Phenol | 8.9 | 569 | | +75 | | | | | |
| 17 | do | Furfural | 14.9 | 50.2 | 25 | +20 | | | | | |
| 18 | East Tex | Phenol | 13.5 | 341 | 17 | +65 | 530 | 610 | 5.76 | 2.36 | |
| 19 | do | do | 11.1 | 61.5 | −56 | +40 | 435 | 475 | 0.42 | 2.7 | 340 |
| 20 | do | do | 13.7 | 360 | +25 | +65 | 550 | 630 | 5.5 | 2.3 | 590 |
| 21 | do | do | 7.7 | 71.1 | −128 | +35 | 420 | 495 | 0.86 | 3.2 | 340 |
| 22 | do | do | 7.3 | 796 | −76 | +65 | 520 | 610 | 7.7 | 3.0 | |
| 23 | do | do | 13.6 | 367.1 | +27 | +80 | 555 | 635 | 5.1 | 2.32 | |
| 24 | do | do | 13.1 | 370.4 | +23 | +60 | 560 | 635 | 4.6 | 2.30 | 560 |

TABLE I—Continued
SOURCES AND PHYSICAL CHARACTERISTICS OF SOLVENT EXTRACTS

| Ext. No. | Crude source | Solvent | API grav. | Sp. gr. at 10° F. | Vis./100° F. | Vis./130° F. | Vis./210° F. | V.I. | Pour | ° F. Flash | ° F. Fire | Iodine No. (Wijs) | Percent C.R. | Percent sulfur |
|---|---|---|---|---|---|---|---|---|---|---|---|---|---|---|
| 41 | East Tex | Phenol | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 vis. neutral, has an average molecular weight of 300, and contained 76.8% aromatics (by the silica gel procedure).
Extract No. 42 was obtained in the production of 150 vis. bright stock, has an average molecular weight of 590, and contained 86% aromatics, 14% saturates, 86.2% carbon, 11.4% hydrogen, and averaged 3.3 aromatic rings per aromatic molecule.
Extract No. 43 was obtained in the production of 170 vis. neutral, has an average molecular weight of 340, contained 84.1% aromatics, 15.9% saturates, 86.4% carbon, 10.7% hydrogen and averaged 2.7 aromatic rings per aromatic molecule.
Extract No. 44 was obtained in the production of 200 vis. neutral, has an average molecular weight of 340, contained 87% aromatics, and 13% saturates.
Extract No. 45 was obtained in the production of 160 vis. bright stock, contained 92% aromatics and 8% saturates.

The solvent extracts from lubricating oils used as starting materials for this invention have the following general properties and characteristics.

TABLE II

| Characteristic: | Range of value |
|---|---|
| Gravity, ° API | 8.0–15.0 |
| Gravity, sp., 380/15.5° C. | 0.9550–1.000 |
| Viscosity, SUS, @ 100° F. | 350–25,000 (ext.) |
| Viscosity, SUS, @ 130° F. | 140–19,000 |
| Viscosity, SUS, @ 210° F. | 200–1500 |
| Viscosity index | −101–+39 |
| Pour point (max.) | +35–100 |
| Color, NPA | +2–5D |
| Molecular weight, average (above 300) | 320–750 |
| Boiling point (initial), ° F. | 300–1000 |
| Boiling point (end), ° F. | 400–1200 |
| Sulfur, percent wt. | 2.0–4.5 |
| Sulfur compounds, percent wt. | 20–50 |
| Aromatics and thio compounds | 50–90 |
| Thio compounds | 14–40 |
| Neutral aromatic hydrocarbons | 40–51 |
| Av. no. of rings/mean arom. mol. | 1.7–3.5 |
| H/C, wt. ratio | 0.116–0.136 |
| H/C, atom ratio, whole sample | 1.383–1.622 |
| H/C, atom ratio, aromatic portion | 1.289–1.500 |
| Nearest empirical formula | $C_{22}H_{30}$–$C_{44}H_{66}$ |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100±5 vis. neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocyclic compounds in the range of 75–98%, the remainder being principally saturates, or material behaving as saturates, together with a minor proportion of up to 7% of organic acids. The organic acids present are not susceptible to extraction by the use of aqueous strong caustic because of the solubility of the alkali metal salts of the acids in the oil. Little or no asphaltic material is present in solvent extracts and they contain essentially no materials volatile at room temperature.

The data shown in Tables I and II are merely illustrative and the invention is not to be limited thereby.

It is apparent that the characteristics of the final condensed product will vary depending on the concentration and types of aromatic starting materials employed. In such complicated mixtures as solvent extracts from lubricating oil fractions, the content of reactable materials may vary from about 30% to 100% by weight of the aromatic and heterocyclic material present.

In carrying out the process of this invention, either formaldehyde or paraformaldehyde may be used. Any formaldehyde polymer yielding substantially anhydrous formaldehyde under the conditions of the process may be employed in this process. Also, halomethyl esters,

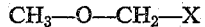

$$CH_3-O-CH_2-X$$

where X represents a halogen, can be used in place of the combination of formaldehyde-producing agent and anhydrous haloacid, but such use substantially increases the cost of the process, and of the products obtained therefrom.

It has been found that by conducting the oxidation of solvent extracts by preheating same to a temperature of about 150° to 250° F. during the addition of the components of the catalyst disclosed herein, and further heating the reaction mixture to 425° to 525° F. during the addition of the sulfur, HCl and the formaldehyde-producing agent, the reaction proceeds to completion with the formation of a resinous product having a stability, softening point, and penetration making it suitable as a coating, resin, or plastic. By proceeding in this manner, products having a softening point of 200° to 220° F. and a penetration of 30 to 40 at 77° F. can be obtained. By incorporating concentrated sulfuric as part of the catalyst, products having softening points of from 205° to 270° F. and penetrations of 12–170 can be produced.

The invention is illustrated by a number of experiments which were conducted using Extract Nos. 23 and 24 from Table I.

In these experiments, a one-liter, three-necked flask, or a wide-mouthed, one liter Erlenmeyer flask was charged with about 500 grams of aromatic extract oil and heated, with stirring in a nitrogen atmosphere. When used, the 25 grams of $ZnCl_2$ and the 10 grams of concentrated $H_2SO_4$ were added at a temperature of about 200° F. The $H_2SO_4$ darkened the extract oil and caused the mixture to foam and bubble for about 45 minutes. The extract oil was heated to and maintained at about 475° F., and sulfur and paraformaldehyde were added according to the following schedule:

| Day | 1st | | | | 2nd | | | |
|---|---|---|---|---|---|---|---|---|
| Hour | 0 | 2 | 4 | 6 | 0 | 2 | 4 | 6 |
| Grams of each, sulfur and paraformaldehyde | 20 | 20 | 20 | | 20 | 20 | | |

In the first three runs using Extract No. 23 of Table I, the two-day addition schedule for sulfur, or sulfur and paraformaldehyde, was followed, but thereafter in Runs 4–8, using Extract No. 24, the reaction was limited to one day. When anhydrous HCl was used, it was bubbled through the extract at 50 cc./min. during the addition of the paraformaldehyde. When two-day runs were made, the extract oil was allowed to cool over night. The use of these different, but closely similar, extracts for the experiments did not change the results, and any changes in properties of the products were due primarily to the techniques used. The reaction conditions and results were as follows:

TABLE III

*Oxidation of Phenol Extract in the Presence of Paraformaldehyde and/or Various Catalysts*

| Oxidation Run number | 1 | 2 | 3 | 4 | 5 | 6 | 7 | 8 |
|---|---|---|---|---|---|---|---|---|
| Grams, extract oil | 500 | 500 | 500 | 501 | 501 | 501 | 501 | 501 |
| Grams, sulfur | 100 | 100 | 100 | 60 | 60 | 60 | 60 | 60 |
| Grams, paraformaldehyde | | 100 | 100 | 60 | | 60 | 60 | 60 |
| Grams, $ZnCl_2$ | | | | 25 | 25 | 25 | 25 | |
| Grams, $H_2SO_4$ (Conc.) | | | | 10 | 10 | 10 | | 10 |
| Hours of HCl flow at 50 cc./min | | | 11.5 | 7.5 | 7.5 | | 7.5 | 7.5 |
| Total hours of heating | 13.5 | 13.5 | 13.5 | 7.5 | 7.5 | 7.5 | 7.5 | 7.5 |
| Max temp. recorded, °F | 490 | 498 | 485 | 480 | 476 | 481 | 458 | 453 |
| Product: | | | | | | | | |
| Softening point, °F | 148 | 150 | 157 | 264 | 109 | 110 | 207 | 111 |
| Penetration at 77° F | 24 | 23 | 21 | 12 | 163 | 103 | 37 | 114 |
| Molecular weight | | | | 873 | 747 | | 805 | |
| Percent chlorine | | | | 2.8 | 2.0 | | 2.8 | |
| Ductility (cm.) | | | | 2.5 | | | 3.5 | |

The products from these experiments were black, asphalt-like materials of varying consistency. The products were tested for softening point and penetration at 77° F. In some cases a determination of chlorine content and molecular weight was made as indicated in the table. The first three runs show that the presence of paraformaldehyde and paraformaldehyde plus anhydrous HCl essentially did not change the properties of a sulfur-oxidized extract. Apparently, neither formation of methylene-linked aromatics nor chloromethylation occurred. Run 4 shows that a harder, less sticky product of markedly superior properties to those of the first three runs is produced when the extract is oxidized with sulfur in the presence of paraformaldehyde plus the catalysts $ZnCl_2$, anhydrous HCl, and concentrated $H_2SO_4$. It should be noted that the time of reaction and the quantities of sulfur and paraformaldehyde required to produce this product are about half those of the first three runs. Run 5 points out the effect of the formaldehyde in the production of the superior product of Run 4. This indicates that cross-linking, and not merely accelerated sulfur oxidation, is responsible for this product. The results of Runs 6 through 8 show that the $ZnCl_2$, HCl, and $H_2SO_4$ are all necessary to produce the product of Run 4, although an intermediate product was obtained in Run 7, where the $H_2SO_4$ was eliminated.

The molecular weights of the products from Runs 4, 5 and 7 are in agreement with expectations. The product of Run 4 has a higher molecular weight than that of Run 5 where the paraformaldehyde was omitted, and the intermediate product of Run 7 has an intermediate molecular weight. The chlorine determinations on these same products, however, point out that chloromethylation in the final product is either absent or negligible, since any chlorine content could be accounted for by residual $ZnCl_2$ and perhaps some HCl. This evidence serves to show that cross-linking is responsible for the products of Runs 4 and 7. Apparently, any intermediate chloromethyl or benzyl alcohol derivative proceeds directly to a methylene linkage. The product of Run 7 is probably due to a lesser degree of cross-linking than in Run 4.

A plot of softening point versus penetration at 77° F. has been made from the experimental data shown in FIGURE 1 wherein four typical curves from the air blowing of ordinary asphalts, having the following composition:

TABLE IV

*Wt. Percent Composition of Known Asphalts*

| Run No. | Sweet Flux | Sour Flux |
|---|---|---|
| 70 | 100 | |
| 81 | 53 | 47 |
| 67 | 15 | 85 |
| 69 | | 100 | have been plotted. The box in the upper left defines the variation of properties allowed in the asphalt flux and the box in the lower right defines the desired properties of the product. Each of the four curves represents the change in properties resulting from the air blowing of a different twoway blend of sweet and sour flux. The significance of the curves is that the final properties of the conventionally air-blown asphalts depend on the flux composition, but that in the present process two distinctly different products (Runs 4 and 7) have been obtained from the same starting material. The conditions which produced the product of Run 7 vary from those of Run 4 only in the omission of sulfuric acid. The products from Runs 4 and 7 also vary significantly from the normal sulfur oxidation (Run 1). The effect of the $H_2SO_4$ and $ZnCl_2$ as catalysts for accelerating the sulfur oxidation appears to be negligible; this further points out that a formaldehyde condensation is responsible for the product of Run 4.

While the produce obtain in Run 4 cannot be termed a true plastic, the results show that it may be possible to produce a similar material by this process, given the proper starting material. For this purpose, an extract which had been fractionated to remove aliphatic hydrocarbons would be suitable starting material. The results also show that the hardening of an extract can be accelerated by use of this process, and that cross-linking can be effected. Specialty asphalts and resin-like materials having tailor-made properties can be produced by this process.

The invention is further demonstrated by Table V wherein the results of runs made on a solvent extract from the manufacture of bright stock (Extract No. 24 in Table I) and FCC unit bottoms to show the effect of processing at 475° F. using different reactants or catalyst combinations etc. on softening point, penetration and ductility.

TABLE V

*Oxidations of a Phenol Extract and an FCC Vacuum Resid*

| Run No | 113 | 134 | 130 | 131 | 132 | 126 | 136 |
|---|---|---|---|---|---|---|---|
| Extract charge (grams) | 500.8 | 500.1 | 500.2 | 500.4 | 500.5 | | |
| Vac resid charge (grams) | | | | | | 500.6 | 500.0 |
| Sulfur (grams) | 60 | 60 | | | | 41.0 | |
| $O_2$ flow rate (cc./min.) | | | (¹) | 3,500 | 3,500 | | 3,500 |
| $O_2$ charged (grams) | | | 1,870 | 1,340 | 1,340 | | 1,470 |
| Paraformaldehyde (grams) | 60 | 60 | 60 | 60 | 60 | 42.5 | 51.1 |
| HCl flow at 50 cc./min. (hours) | 7.5 | 7.5 | 10 | 5 | 5 | 7.5 | 5.5 |
| $ZnCl_2$ (grams) | 25 | 25 | 25 | 25 | 25 | 25 | 30 |
| $H_2SO_4$ (grams) (95.5% conc.) | | | 10 | 10 | 10 | 10 | 12 |
| $P_2O_5$ (grams) | 10 | | | | | | |
| $H_3PO_4$ (grams) | | 10 | | | | | |
| Total hours of heating | 7.5 | 7.5 | 10 | 5 | 5 | 7.5 | 5.5 |
| Max. temp. recorded (° F.) | 482 | 480 | 500 | 490 | 486 | 491 | 500 |
| Softening point (° F.) | 151 | 120 | 310 | 320 | 222 | 190 | 302 |
| Penetration at 77° F | 35 | 82 | 34 | 24 | 36 | 39 | 48 |
| Ductility (cm.)² | 16 | (³) | 3 | 2 | 3.5 | 3 | 2 |
| Molecular weight | 930 | 730 | 830 | 855 | 865 | 940 | (³) |
| Percent chlorine | 0.56 | 0.3 | 1.0 | 1.2 | 1.1 | 0.64 | 1.6 |

¹ 2120 cc./min. for 7 hours and 3000 cc./min. for 3 hours.
² ASTM Test D113.
³ Not determined.

Figure 2:
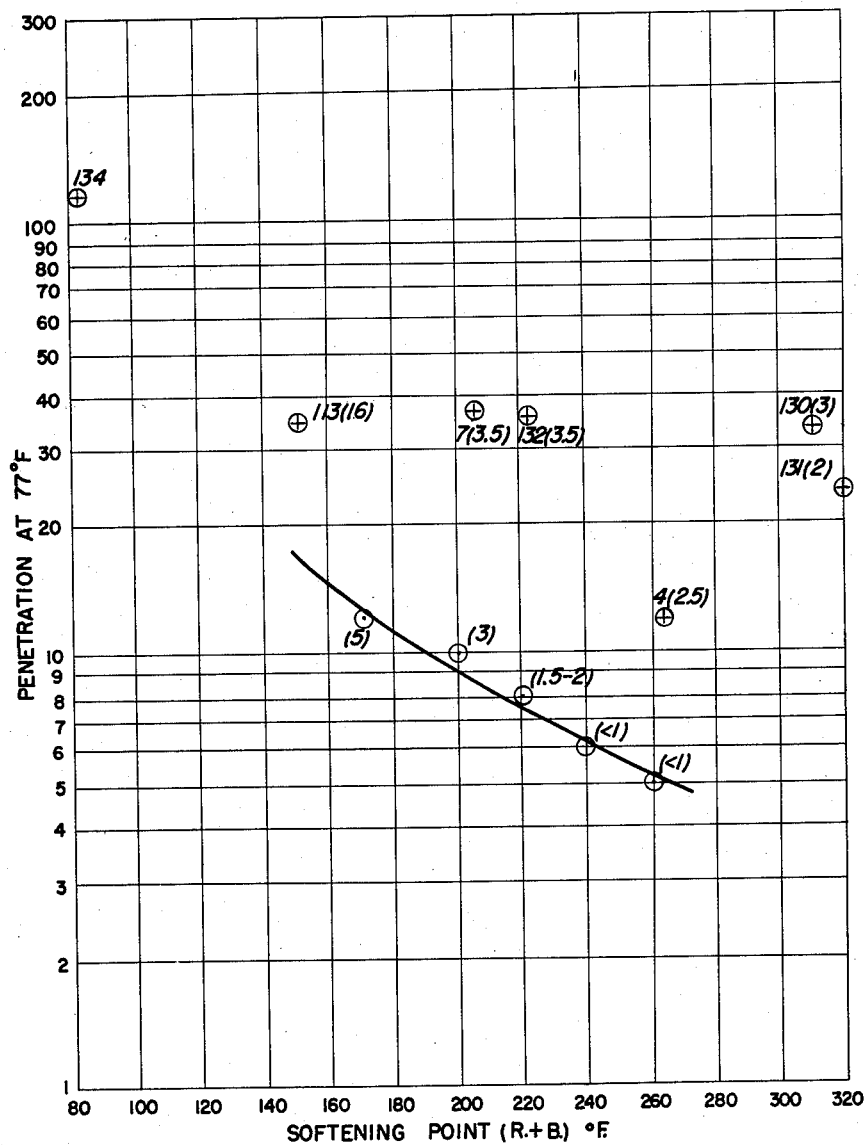
Figure 3:
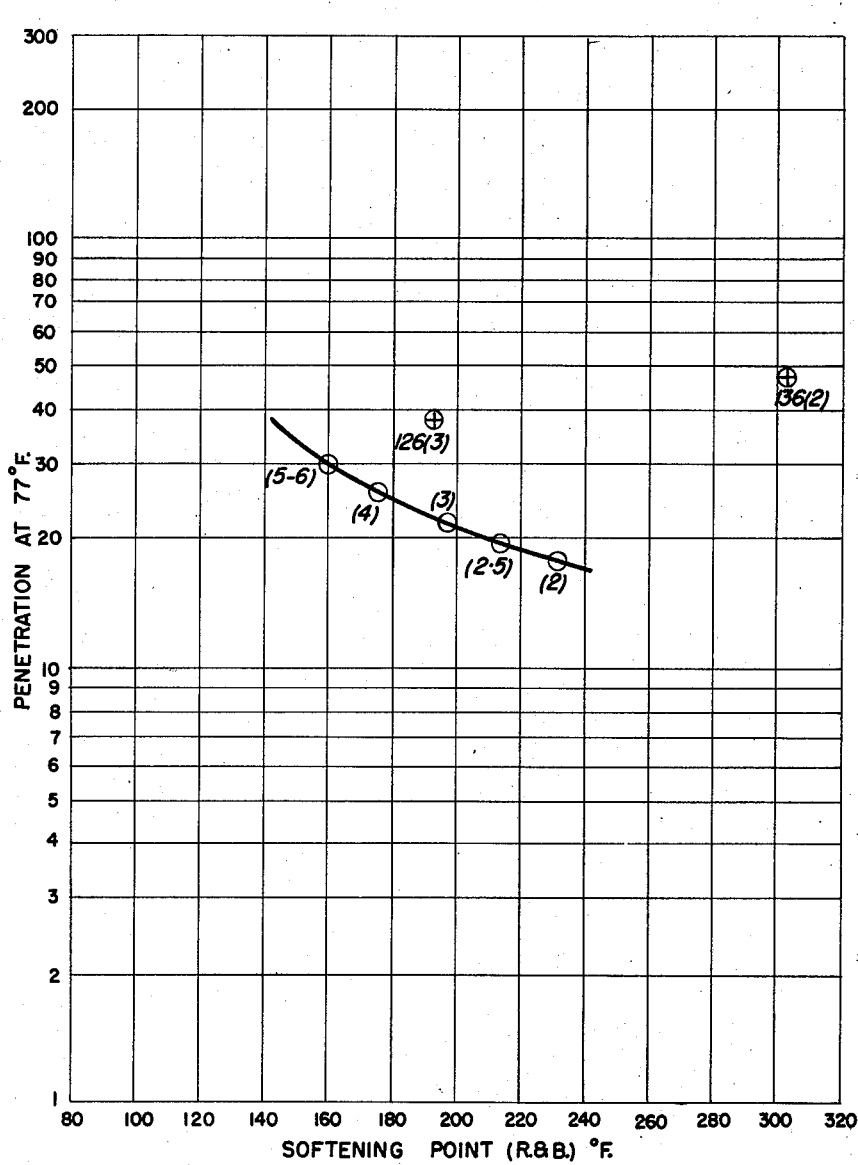

These results show that the process of this invention gives products which are superior in their softening-point-penetration relationships to conventional air-blown materials. The air flow rate for the curves of FIGURES 2 and 3 was 500–600 cubic feet per minute per ton. Runs 130, 131 and 132 illustrate the abnormally high penetrations obtained by the process of this invention and in comparison with the other results herein show that the new products have higher penetrations than conventional air-blown asphalts. Increases in ducticilty are also shown which are unique, and in general, the ductility tends to decrease with increased softening point. The results also show (Runs 113 and 134) that phosphorus pentoxide and phosphoric acid are not the equivalent of sulfuric acid and that oxygen can be substituted for sulfur to obtain enhanced softening point-penetration relationships. The results also show that those air-blown products having softening points above 240° F. all have ductilities below 2, while in contrast the instant process produces products with softening points above 300° F. which have ductilities of 2 or higher. The results shown in Table V are represented graphically in FIGURES II and III. The numbers opposite the points on the graphs correspond to the run numbers and the numbers in parentheses are the ductilities. The curves shown represent the results obtainable by conventional air-blowing the indicated materials. The FCC unit bottoms had the following properties before processing: sp. gr., 60/60° F., 0.979; vis., SUS, @ 210° F., 1331; vis., SFS, @ 210° F., 136.3; flash, COC, 595° F.; penetration at 77° F., too soft; softening point (R. & B.), ° F. 80; solubility in $CCl_4$, 99.4 wt. percent, ductility, too soft and was Oliensis positive.

In carrying out the reaction, the following ratios of reactants may be used at a temperature of about 425° to 525° F.

TABLE VI

| Reactant: | Ratio (parts by wt.) |
|---|---|
| Solvent extract | 400–600 |
| Sulfur or oxygen | 50–2000 |
| Formaldehyde-producing agent | 50–70 |
| Condensation agent | 20–30 |
| Concentrated $H_2SO_4$ | 0–20 |

The product is resinous in character and has utility as a coating for insulating materials, as a mastic, or in the formation of wire coatings and the like.

Any hydrocarbon material that can be benefited or hardened by air-blowing may be used in the present process, such as materials known as asphalts, bitumens, asphaltenes, petrolenes, maltenes, carbenes, petroleum resins, and aromatic petroleum residues; asphalts from coal extracts, asphalts obtained from coal resins, from fuel oil, from hydrocarbon oils, and from lubricating oils; and asphalts from naphthene, paraffin and asphalt base crudes. Typical results of air-blowing of these materials are increases in specific gravity, fixed and free carbon, total saponifiables, acid number, etc., and decrease in oily constituents. These materials predominate in high-molecular-weight olefins, paraffins, aromatics and naphthenic-type hydrocarbons, mixed or combined with acidic materials, sulfur, oxygen and nitrogen compounds, and include ring compounds of the six-membered type in addition to cyclopropanes, cyclopentanes, cycloheptanes, and cyclooctanes, decanaphthene, hendecanaphthenes, and naphthenes with 13 to 26 carbon atoms. Other ingredients are cyclopentadecane, cycloheptadecane and cyclotriacontine. Ring compounds of the biphenyl and naphthalene types are also present, as are compounds wherein an oxygen, sulfur, or carbon-atom bridge connects the large molecules to each other.

When solvent extracts are utilized as the starting materials, the condensed products are mixtures with R groups containing dihydronaphthalene, dihydrophenanthrene and dihydroanthracene configurations averaging in molecular weight up to 750, having several alkyl groups in each aromatic nucleus wherein the sum of the carbon atoms in the alkyl groups is between 15 to 22, containing 1.9 to 4.5% total sulfur (naturally occurring) in the form of heterocyclic rings and which have 30–40% of the carbon atoms in aromatic configuration, 20–35% in naphthenic configuration and 31–47% in paraffinic configuration by the method of Kurty et al. (Anal. Chem. 28, 1928, 1956).

The foregoing are representative of radicals coming within the definition of R in the formulas used herein. The term "asphaltic material" as used herein is intended to mean any hydrocarbon material that can be benefited or hardened by air-blowing, and "petroleum residues" is intended to mean those high-molecular-weight materials left or produced as a result of petroleum refining processes, such as distillation, solvent extraction, deasphalting, clay treating, etc., having asphalt-like properties.

The anhydrous haloacids to be used in the process of this invention are hydrochloric acid, hydrochromic acid, and hydroiodic acid and mixtures thereof. Other metal salts besides zinc chloride that may be used are copper chloride, copper bromide, iron chloride, iron bromide, copper iodide, aluminum chloride, aluminum bromide, and other materials of a Friedel-Crafts type, such as boron trifluoride. The process is applicable to the use of concentrated sulfuric acid, that is, sulfuric acid containing from about 95.5% to 100% sulfuric acid as is commercially available. The term oxidation is intended to include oxidation by sulfur, selenium, or oxygen and mixtures thereof. Although preferred embodiments of the invention have been illustrated by specific examples, the process may be conducted by other means. The components of the catalyst may be added sequentially to the cold asphaltic material and the mixture preheated to 150° to 250° F. before the addition of the sulfur and formaldehyde. The sulfuric acid may be added during the preheating stage, at the end of the preheating stage, or along with the oxygen or sulfur and formaldehyde. The preheating stage may be omitted, and all of the catalyst components except HCl and the oxygen, selenium or sulfur added to cold asphaltic material prior to heating, or the chloromethylation step may be carried out first at a lower temperature of about 100° F. to 200° F. with the oxidation step subsequently at around 475° F. The chloromethylation step as disclosed in copending application Serial No. 855,257, filed November 25, 1959, now Patent No. 3,076,039, by G. W. Ayers and W. C. Allinder may be used. By the process of this invention, asphaltic materials can be produced having softening points of 150° to 350° F., penetrations at 77° F. of up to 50 and ductilities greater than 2.0.

The embodiments of the invention in which an exclusive property or privilege is claimed are defined as follows:

1. The reaction product of about 500 parts of solvent extract from the solvent extraction of mineral lubricating oils using a solvent selective for aromatic compounds, about 60 parts of sulfur, about 60 parts of paraformaldehyde, about 25 parts of zinc chloride and about 33.6 parts of anhydrous hydrochloric acid at a temperature of about 480° F.

2. The reaction product of about 500 parts of solvent extract from the solvent extraction of mineral lubricating oils using a solvent selective for aromatic compounds, about 60 parts of sulfur, about 60 parts of paraformaldehyde, about 25 parts of zinc chloride, about 7.5 hours of flow at 50 cc./min. of anhydrous hydrochloric acid, and about 10 parts of concentrated sulfuric acid at a temperature of about 480° F.

3. The process of upgrading residual asphaltic hydrocarbons which comprises subjecting about 400 to 600 parts of said asphaltic residual hydrocarbons to oxidation at a temperature of about 425° to 525° F. with about 50 to 2000 parts of an oxidizing agent of the group consisting of sulfur, selenium, oxygen and mixtures thereof, and simultaneous reaction with about 50 to 70 parts of a formaldehyde-producing agent of the group consisting of formaldehyde, paraformaldehyde and mixtures thereof, about 20 to 30 parts of a condensation agent of the group consisting of zinc chloride, aluminum chloride, boron trifluoride and mixtures thereof, 0 to 20 parts of concentrated sulfuric acid and a gaseous anhydrous haloacid of the group consisting of hydrogen chloride, hydrogen bromide, hydrogen iodide and mixtures thereof, and recovering an oxidized-condensed, halomethylated and cross-linked product.

4. The process of upgrading residual hydrocarbons of the group consisting of FCC vacuum residua and solvent extracts obtained in the solvent extraction of mineral lubricating oils using a solvent selective for aromatic compounds which comprises subjecting about 400 to 600 parts of said residual hydrocarbons to oxidation at a temperature of about 425° to 525° F. with about 50 to 2000 parts of an oxidizing agent of the group consisting of sulfur, selenium, oxygen and mixtures thereof, and simultaneous reaction with about 50 to 70 parts of a formaldehyde-producing agent of the group consisting of formaldehyde, paraformaldehyde and mixtures thereof, about 20 to 30 parts of a condensation agent of the group consisting of zinc chloride, aluminum chloride, boron trifluoride and mixtures thereof, 0 to 20 parts of concentrated sulfuric acid and a gaseous anhydrous haloacid of the group consisting of hydrogen chloride, hydrogen bromide, hydrogen iodide and mixtures thereof, and recovering an oxidized-condensed, halomethylated and cross-linked product.

5. The process in acordance with claim 4 in which said residual hydrocarbon is solvent extract obtained in the solvent extraction of mineral lubricating oils using a solvent selective for aromatic compounds, said oxidizing agent is sulfur, said formaldehyde-producing agent is paraformaldehyde, said condensation agent is zinc chloride, and said anhydrous haloacid is hydrogen chloride.

6. The process in acordance with claim 4 in which said residual hydrocarbon is preheated to a temperature of about 150° to 250° F. during the reaction with said condensation agent and said sulfuric acid and the reaction mixture is finally heated to about 425° to 525° F. during reaction with said oxidizing agent, said anhydrous haloacid and said formaldehyde-producing agent.

7. The process in acordance with claim 4 in which said residual hydrocarbon is reacted with said formaldehyde-producing agent, said condensation agent, said concentrated sulfuric acid and said haloacid at a temperature of about 100° F. to 200° F. and then reacted with said oxidizing agent at a temperature of about 425° to 525° F.

8. The resinous ductile composition prepared by the reaction at a temperature of about 425° to 525° F. of
  (1) residual asphaltic hydrocarbons,
  (2) an oxidizing agent of the group consisting of sulfur, selenium, oxygen and mixtures thereof,
  (3) a formaldehyde-producing agent of the group consisting of formaldehyde, paraformaldehyde and mixtures thereof,
  (4) a condensation agent of the group consisting of zinc chloride, aluminum chloride, boron trifluoride and mixtures thereof,
  (5) concentrated sulfuric acid, and
  (6) a gaseous anhydrous haloacid of the group consisting of hydrogen chloride, hydrogen bromide, hydrogen iodide and mixtures thereof, in which the ratio of said reactants is about 40 to 60 parts of said residual asphaltic hydrocarbons to 5 to 200 parts of said oxidizing agent, to 5 to 7 parts of said formaldehyde-producing agent, to 2 to 3 parts of said condensation agent to 0 to 2 parts of said concentrated sulfuric acid.

9. The resinous ductile composition prepared by the reaction at a temperature of about 425° to 525° F. of
  (1) a residual hydrocarbon of the group consisting of FCC vacuum residua and solvent extracts obtained in the solvent extraction of mineral lubricating oils using a solvent selective for aromatic compounds,
  (2) an oxidizing agent of the group consisting of sulfur, selenium, oxygen and mixtures thereof,
  (3) a formaldehyde-producing agent of the group consisting of formaldehyde, paraformaldehyde and mixtures thereof,
  (4) a condensation agent of the group consisting of zinc chloride, aluminum chloride, boron trifluoride and mixtures thereof,
  (5) concentrated sulfuric acid, and
  (6) a gaseous anhydrous haloacid of the group consisting of hydrogen chloride, hydrogen bromide, hydrogen iodide and mixtures thereof, in which the ratio of said reactants is about 40 to 60 parts of said residual asphaltic hydrocarbons to 5 to 200 parts of said oxidizing agent, to 5 to 7 parts of said formaldehyde-producing agent, to 2 to 3 parts of said condensation agent to 0 to 2 parts of said concentrated sulfuric acid.

10. The process of upgrading residual asphaltic hydrocarbons which comprises subjecting said residual asphaltic hydrocarbons to oxidation at a temperature of about 425° to 525° F. with an oxidizing agent of the group consisting of sulfur, selenium, oxygen and mixtures thereof and simultaneous reaction with a formaldehyde-producing agent of the group consisting of formaldehyde, paraformaldehyde and mixtures thereof, a condensation agent of the group consisting of zinc chloride, aluminum chloride, boron trifluoride and mixtures thereof, concentrated sulfuric acid and a gaseous anhydrous haloacid of the group consisting of hydrogen chloride, hydrogen bromide, hydrogen iodide and mixtures thereof, the ratio of said reactants being about 40 to 60 parts of said residual asphaltic hydrocarbon to 5 to 200 parts of said oxidizing agent, to 5 to 7 parts of said formaldehyde-producing agent, to 2 to 3 parts of said condensation agent and to 0 to 2 parts of said sulfuric acid.

11. The process of upgrading residual asphaltic hydrocarbons which comprises subjecting said residual asphaltic hydrocarbons to reaction with a formaldehyde-producing agent of the group consisting of formaldehyde, paraformaldehyde and mixtures thereof, a condensation agent of the group consisting of zinc chloride, aluminum chloride, boron trifluoride and mixtures thereof and a gaseous anhydrous haloacid of the group consisting of hydrogen chloride, hydrogen bromide, hydrogen iodide and mixtures thereof at a temperature of about 100° F. to 200° F. and subsequent reaction with an oxidizing agent of the group consisting of sulfur, selenium, oxygen and mixtures thereof at a temperature of about 425° to 525° F., the ratio of said reactants being about 40 to 60 parts of said residual asphaltic hydrocarbon to 5 to 7 parts of said formaldehyde-producing agent, 2 to 3 parts of said condensation agent and 0 to 2 parts of said sulfuric acid and 5 to 200 parts of said oxidizing agent.

References Cited in the file of this patent

UNITED STATES PATENTS

| | | |
|---|---|---|
| 2,095,190 | Heuscher | Oct. 5, 1937 |
| 2,382,184 | Thompson | Aug. 14, 1945 |
| 2,764,523 | Cottle et al. | Sept. 25, 1956 |
| 2,906,687 | Roediger | Sept. 29, 1959 |
| 2,957,851 | Fetterly | Oct. 25, 1960 |
| 3,000,859 | Mervess et al. | Sept. 19, 1961 |
| 3,076,039 | Ayers et al. | Jan. 29, 1963 |

FOREIGN PATENTS

| | | |
|---|---|---|
| 50,136 | Norway | Feb. 1, 1932 |

OTHER REFERENCES

Fulton et al.: "Industrial and Engineering Chemistry," vol. 32, No. 3, March 1940, pp. 304–309.